United States Patent [19]

Rosenberg

[11] 4,263,703

[45] Apr. 28, 1981

[54] PROCESS OF MANUFACTURING A COIL CAPACITOR

[76] Inventor: Jean M. L. Rosenberg, 83, rue Desiree Richebois, 94 Fontenay-sous-bois, France

[21] Appl. No.: 46,376

[22] Filed: Jun. 7, 1979

Related U.S. Application Data

[63] Continuation of Ser. No. 872,005, Jan. 24, 1978, abandoned.

[30] Foreign Application Priority Data

Feb. 4, 1977 [FR] France .................................. 77 03135

[51] Int. Cl.³ ............................................ H01G 13/02
[52] U.S. Cl. ..................................... 29/25.42; 29/593; 242/56.1
[58] Field of Search ............................. 29/25.42, 593; 242/56.1; 361/324

[56] References Cited

U.S. PATENT DOCUMENTS

| 2,950,070 | 8/1960 | Thorson et al. | 242/56.1 |
| 3,073,008 | 1/1963 | McGraw, Jr. | 242/56.1 X |
| 3,432,901 | 3/1969 | Fanning | 242/56.1 X |
| 3,474,370 | 10/1969 | Lightner | 242/56.1 X |
| 3,641,640 | 2/1972 | Rayburn | 29/25.42 |

*Primary Examiner*—Carl E. Hall
*Attorney, Agent, or Firm*—Michael J. Striker

[57] ABSTRACT

A process of manufacturing a coil capacitor of a predetermined number of turns and capacitance, includes the steps of winding metallized strips upon a winding mandrel to form a first number of turns thereon, measuring the capacitance of the first turns on the mandrel during winding and initiating demetallization of not-yet-wound parts of the strips when the capacitance of the turns on the mandrel reaches a predetermined level. The demetallized parts of the strips are wound onto the mandrel to form thereon a second number of turns. The demetallized parts are wound onto the mandrel until the combined first and second turns together form a capacitor having a predetermined number of turns.

6 Claims, No Drawings

PROCESS OF MANUFACTURING A COIL CAPACITOR

CROSS-REFERENCE TO RELATED APPLICATION

This application is a continuation of application Ser. No. 872,005 filed Jan. 24, 1978, now abandoned.

The present invention relates to a new process of manufacturing coil capacitors.

It is well known that coil capacitors are produced by way of winding metallized films upon a spindle or a mandrel.

The capacitors have to have the same capacitance within a severe tolerance of 1%.

This problem may be solved by means of determining the number of the turns necessary for obtaining the desired capacitance when the number of turns reaches a predetermined level, the winding process is stopped.

However, the capacitance values of the capacitors having been produced by this way considerably differ from one another. This might be explained by the fact that the capacitance of a capacitor can not be precisely proportional to the length of the metallized film, since the same may, for instance, have various widths and/or thicknesses of the metallized band along the elongation thereof.

In order to avoid this shortcoming, there also has been suggested another procedure. The capacitance of the coil has been measured during the winding operation. The winding process is stopped when the capacitance of the coil arrives at the desired value.

But, not even this procedure is satisfactory. The same requires that insulating spindles be utilized. In view of the fragility of such spindles any possiblity of winding a plurality of capacitors upon the same spindle is excluded.

Moreover, not all capacitors have the same number of the spiral turns and have very various diameters, which is very disadvantageous, since the same have to be manipulated by grips of a machine soldering the electrodes. Furthermore, this difference in the number of the turns of capacitors also excludes the possibility to wind a number of capacitors upon the same spindle, provided the latter could be sufficiently resistant to mechanical stresses.

The winding machine has to be stopped with a great deal of precision. However, in order to do this the speed of rotation of the spindle has to be reduced before the desired capacitance has been obtained.

The manufacturing process proposed by this invention overcomes these inconveniences and consists in measuring the capacitance during the winding operation and demetalizing at least the portion of the film after the desired capacitance value has been reached without stopping the winding operation.

Preferably the first spiral turns of the films are demetalized, thus permitting to the use of metallic spindles.

The metallized face of the film passes over a pair of electrodes energized by supplying to them a corresponding electrical current which provokes volatillization of the metallic layer of this film.

Both films may be demetalized, however, the demetalization of just one of them is sufficient for annihilating the metallization effects of the other one.

It is possible to use one electrode for measuring purposes, whereas the second electrode is used for demetalizing purposes.

After the desired capacitance value has been obtained, the apparatus of measurement sends a corresponding signal to the demetalizing electrodes. The construction of a corresponding electric equipment is within the knowledge of a person trained in the art.

During the demetalization, the spindle continues to revolve to thereby wind, (i.e., to the periphery of the capacitor), spiral neutral protective turns, i.e. turns without any capacitance.

After the spindle has been stopped, the capacitor is finished and is ejected, but the demetalization continues at the beginning of winding of a successive capacitor, so that there are created some central neutral spiral turns. A switch element (such as a counter of the turns or a timed relay, etc.) stops the demetalizing operation and starts the measurement of the capacitance of the winding.

The rotation of the spindle is so determined as to wind a plurality of spiral turns that is well superior to that which is necessary for obtaining the desired capacitance.

The process of the present invention allows to obtain capacitors which all have the same capacitance, the same total number of the turns. There capacitors have neutral turns in the center thereof and on their periphery.

This process of manufacturing capacitors in accordance with the present invention permits a much more rapid production rhythm because contrary to the known processes, there is no more need for slowing the spindle at the end of the winding operation.

At the end of the winding operation the machine has wound the neutral turns. Generally, it does not matter whether there has been wound a greater or smaller number of the neutral turns, since such a light variation does not influence the capacitance value.

It is worthwhile to remark that since the exterior turns' are neutral, these turns may be affixed at their terminals to the capacitor by partially melting the material thereof. This does not imply any risk of a short-circuiting of such a capacitor.

What is claimed is:

1. A process of manufacturing a coil capacitor having a predetermined number of turns and a predetermined capacitance, comprising the steps of
    winding metallized strips upon a winding mandrel to form a first number of turns thereon;
    measuring the capacitance of the first turns on the mandrel during such winding;
    initiating demetallizing of not-yet-wound parts of the strips when the capacitance of the turns already wound on said mandrel reaches a predetermined level;
    winding the demetallized parts of the strips onto said mandrel to form thereon a second number of turns; and
    continuing to wind said demetallized parts of said strips onto said mandrel until the combined first and second turns together form a capacitor having a predetermined number of turns.

2. A process as defined in claim 1; and further comprising the step of severing the capacitor from said strips only when the combined first and second turns together form the capacitor having said predetermined number of turns.

3. A process as defined in claim 1, wherein said first and second number of turns together constitute a predetermined combined number of turns which is constant for all capacitors of the same capacitance, wound on said mandrel.

4. A process as defined in claim 1; and further comprising the step of demetallizing a portion of said metallized strips before the latter are wound on the mandrel to form said first number of turns thereon.

5. A process as defined in claim 4; and further comprising the step of winding said demetallized portion of said strips on said winding mandrel to form a third number of turns thereon.

6. A process as defined in claim 5, wherein said third number of turns is wound on said winding mandrel simultaneously forming said first number of turns thereon.

* * * * *